T. HYATT.
ILLUMINATING ROOFS AND ROOF PAVEMENTS.
No. 68,332. Patented Aug. 27, 1867.
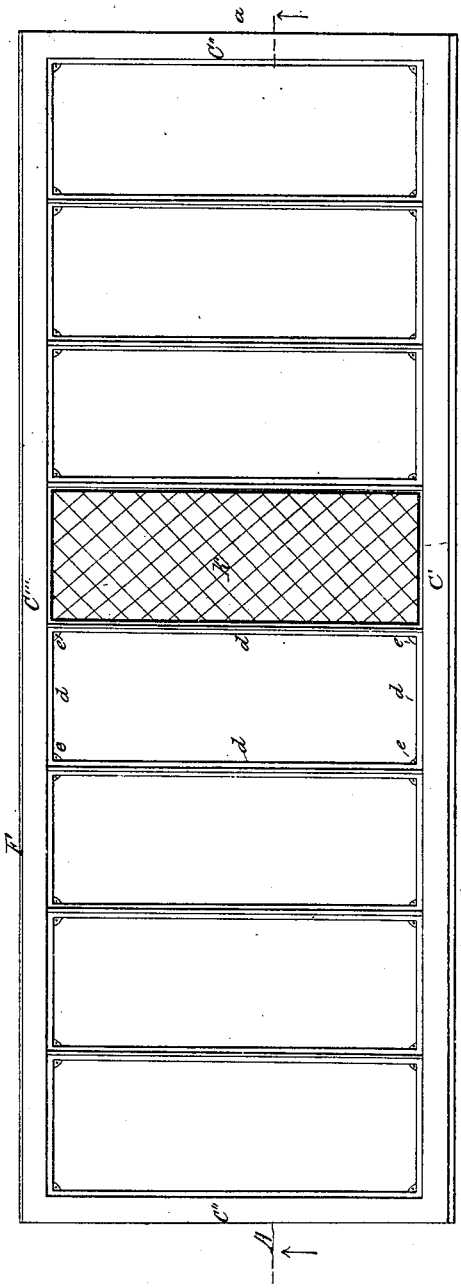
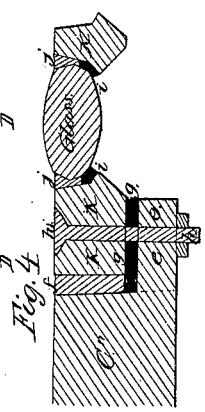
Witnesses:
J. R. Hayes
Joseph Busey
Inventor:
Thaddeus Hyatt 4 Sheets—Sheet 2.
T. HYATT.
ILLUMINATING ROOFS AND ROOF PAVEMENTS.
No. 68,332.                  Patented Aug. 27, 1867.
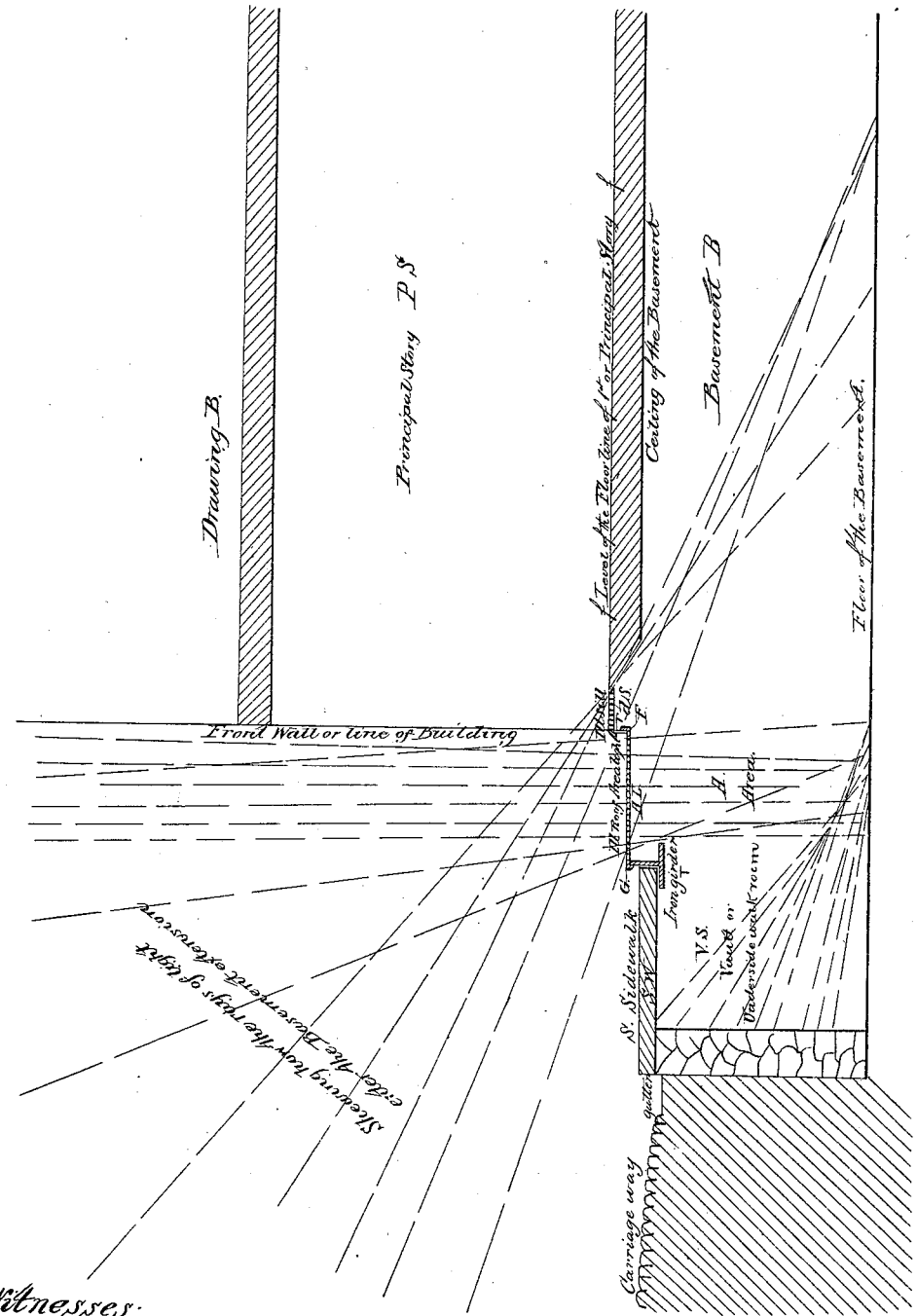
Witnesses:
Joseph Busey
J. R. Hayes
Inventor:
Thaddeus Hyatt

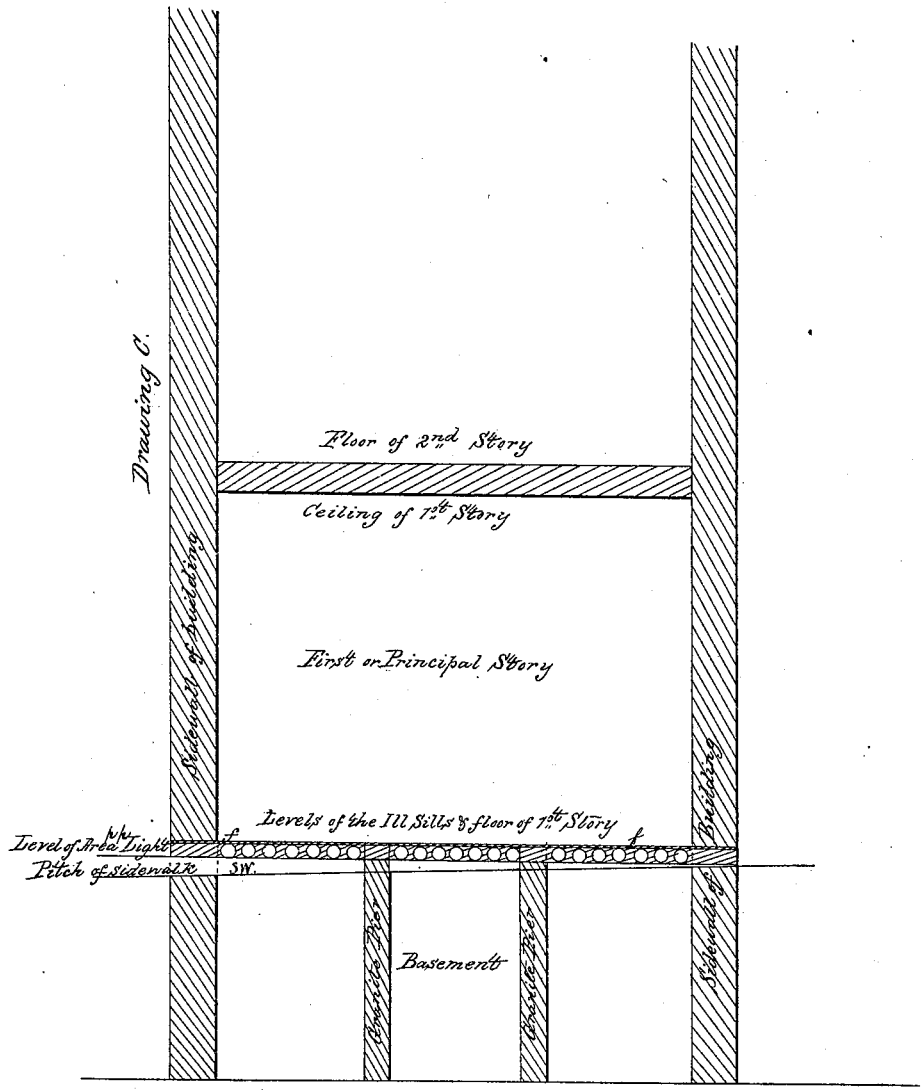

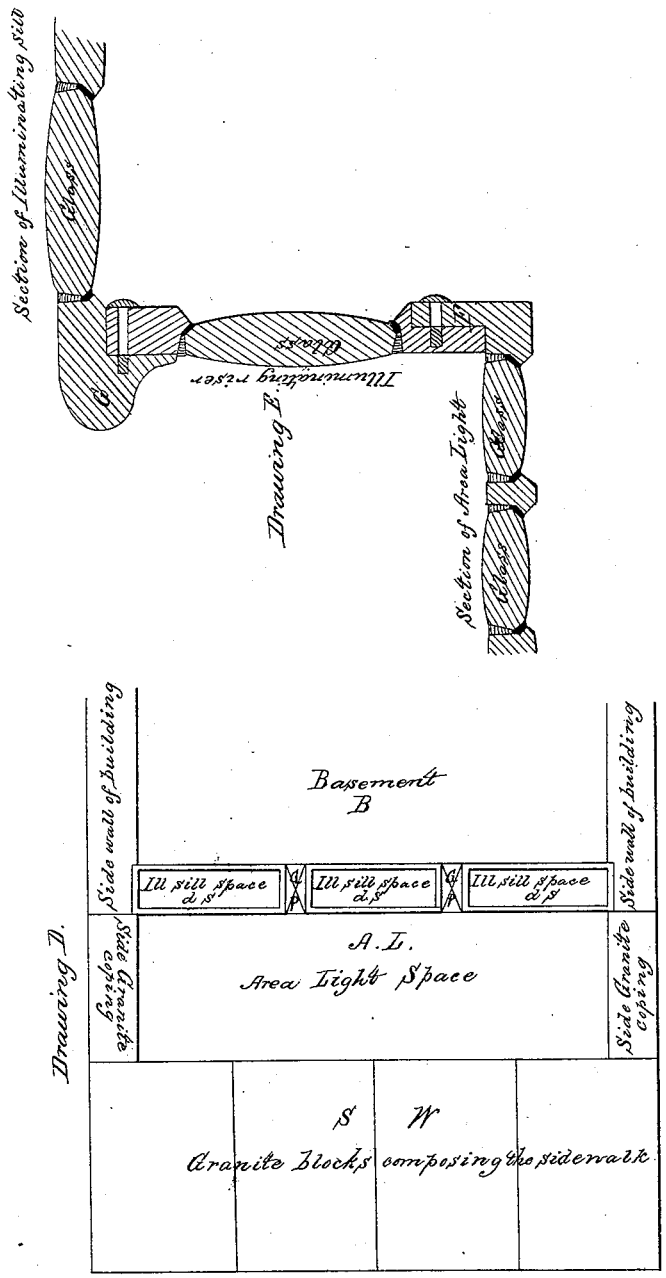

UNITED STATES PATENT OFFICE.

THADDEUS HYATT, OF NEW YORK, N. Y., ASSIGNOR TO ELIZABETH ADELAIDE LAKE, OF SAME PLACE.

IMPROVEMENT IN ILLUMINATING-ROOFS AND ROOF-PAVEMENTS.

Specification forming part of Letters Patent No. 68,332, dated August 27, 1867.

*To all whom it may concern:*

Be it known that I, THADDEUS HYATT, a citizen of the United States, late of New York, now domiciled at Atchison, Kansas, have made certain new and useful improvements in constructing and combining my patented illuminating vault-covers so as to form roofs by the combination, of such strength as to be also suitable for sidewalks—that is to say, where the sidewalk serves as a roof to an underground room.

By the term "sidewalk" I mean to include also the stoop or covering to the area or area-way that lights the basement, the purpose of the invention being to change the use of the space underneath sidewalks from coal-vaults to finished apartments capable of becoming a portion of the basement. This purpose I effect, mainly, by the area, which, by the old method of building, was a chasm to separate but by my method becomes a bond to unite the two; and this bond is effected because my illuminating-roof to the area is also a roof-pavement—that is to say, a surface of glass and iron suitable for being walked upon.

I do not claim to be the first to enlarge a basement by taking into it the area-space, nor the first to incorporate the area-space into the basement by a glass covering; but I do set forth as my invention that my glass covering does not barricade the doorways of the building. My glass covering is in the nature of a bridge instead of a barricade—that is to say, it joins the sidewalk to the building, and thus keeps the communication open from the street to the doorways. This feature will be better understood by considering the condition of the art as I found it. The only actual basement extension which I found when I began my improvements was where the area-way alone was taken into the basement, not the vault beyond it, and this area was covered by a skylight, and this skylight was above the level of the street, and then the whole thing was cut off from the sidewalk by an iron railing. This was the state of the art as I found it. Now, a skylight is merely a shield against the weather—a covering to an opening in a roof, as a vault-cover is to a coal-hole in the sidewalk. Neither is incorporated into its support in such way as to become a part of its general strength. The iron railing to the skylight which covered the area-way above alluded to proves the weak and dangerous character of such structures. Their insecurety in roofs of buildings has also been fatally proven in New York on several occasions, where intrepid firemen have lost their lives, while their utter uselessness as protection against fire, or, rather, their dangerous character as exposing premises to fire, led the fire-insurance companies of New York to put a heavy extra-hazardous premium on all warehouses where they were in use; but in the same book of published rates of insurance where this extra premium on skylights was printed stood the following: "No extra charge where Hyatt's roof-lights are employed." The skylight to the area-way of the basement above spoken of was made by setting the sashes on an incline against the building, their lower edges being fastened to the area-coping, and their upper edges to the face of the wall against which they were supported. The arrangement was therefore in the nature of a barricade to the doorways of the principal story. All other underground rooms existing at that period, those at the New York Sun buildings included, were simply vaults, and lighted from light-holes. All were apartments distinct from the basements, and none of them were able to add light to the basement, for they had not sufficient light for themselves.

The first thoroughly-lighted vault ever constructed was made so by a sidewalk of my lights, laid by me for the New York Herald building in the year 1850. This enabled me, two years later, to get the opportunity of laying down an actual basement extension, taking in all the space under the sidewalk, and going two stories under ground; but that year, the following, and the next were required in order to perfect the work so as to secure the public confidence, which was accomplished only when, after repeated failures, I at length succeeded in making water-tight joints that would stand both summer and winter and concussions of every kind and constantly repeated.

About the year 1855 my invention began to be regarded by property-holders and architects as an established success. About that time, also, it began to be stolen. The water-tight joint of which I have spoken was a double or cemented joint, consisting of putty. as the lower or horizontal half, and a fusible cement as the upper or vertical half, as will appear more fully in what follows.

In my illuminating-roof I call the gratings "tiles," to distinguish them from "vault-covers," and I call them so also because their function is that of a "covering" to "framing," where the two combine to form a roof. These tiles differ in construction from my vault-cover of 1845, for the glasses in those were confined to their seats by being held between the two metal plates of which the cover was composed, so that to repair one a number had to be disturbed. Moreover, the strength of the grating was divided between the two plates. My tiles are cast in one plate, with the seats for the glasses in the upper face, so as to be entered from the top side, and each glass is held in position by itself by means of the double-cemented joint. In this way I get stronger, better, and cheaper lights than before. I also make the tiles in narrow strips, by which means I secure the least possible thickness of iron consistently with their strength, for the apertures in these gratings being small, the thickness of the tile is a matter of great importance, the spread of the light through them being dependent on their depth as proportioned to their diameters. Narrow tiles are stronger than wide ones of the same thickness, because hot flowing metal chills in proportion to the smallness of its stream and the distance it travels in the flask. Moreover, in constructing an illuminating-roof, where the illuminating-gratings are the covering, and the work is required to have permanent water-tight joints, narrow tiles are better than wide ones of the same thickness, because the supports are thus multiplied, which makes a stiffer roof, and renders the water-tight seams less liable to be broken. When I combine these tiles to form roofs not designed for pavements, I usually make the framing in detached pieces, for convenience of casting and handling; but where I form area-coverings of them, I prefer to make the framing in one casting, the size of areas in general permitting this. Under such circumstances this framing-piece is cast with a border of dead-iron, which forms the boundary of the piece on all sides, like a picture-frame, and the inclosed space is at the same time divided into six or more spaces by cross-bars, that are cast with the frame to give it greater strength. The illuminating-tiles are bolted into these spaces each upon a bed of putty, and then the surrounding vertical seam is filled with fusible cement. In this way a double-cemented joint is formed.

The drawings attached to this specification, and which form parts of it, are as follows, viz: A B C D E.

The figures on A represent my illuminating-roof as combined to form an area-light or roof-pavement. Figure 1 is a plan; Fig. 2, a longitudinal section through A a. Fig. 3 is an end view. Fig. 4 shows a section of the frame C", where the tile k k rests upon the putty bed g g, (colored red.) f f show the fusible cement in the vertical seam. c' c" c" c"' is the frame, cast in one piece. c' is the front edge. c" c" are the ends. c"' is the rear. D D are cross-bars that divide the space into sections corresponding to the illuminating-tiles designed to fill them. d d is the seat or rabbet of the frame in which the tile rests. e e are lugs for the bolts h h. Between the tile and the frame, Fig. 4, Drawing A, g g (colored red) is the bed of putty on which the tile k k rests, and f f is the fusible cement. h h is the bolt that holds k k to the frame c". i i (colored red) show the putty bed on which the glass rests, and j j show the vertical seam around it, of fusible cement. This figure, 4, Drawing A, is full size. In the plan, Fig. 1, Drawing A, only one space is represented, with an illuminating-tile shown at k. The glasses are here represented as diamond-shaped; but ordinarily they are circular or hexagonal. F on Fig. 3 is the rising lip at the rear of the frame, (shown enlarged on Drawing E,) to which the lower part of the illuminating-riser is bolted and packed to make a water-tight joint.

Drawing E shows how the illuminating-sill, illuminating-riser, and area-light are combined to make tight joints.

Drawing B is a sectional elevation of a building, where A is the area-space underneath the area-light A L. V S is the vault-space under the sidewalk S W, here formed of granite slabs. B is the basement. P S is the first or principal story. d s is the illuminating door-sill. r is the illuminating-riser under the door-sill; F, the "rising lip" of the area-light. G is the nosing of the area-light where it sets over the iron riser at the sidewalk. As here represented, the "web" of the iron girder T forms the riser to the area-light. This girder also supports the sidewalk as well as the area-light; but sometimes stone coping is used to inclose the area. In such cases I set the iron frame of my area-light into a rabbet cut in the coping, and bed it on putty and fill the vertical space with fusible cement, bolting the frame to the stone coping at the same time.

Drawing C is a front elevation of B, to show the illuminating-risers, and also the levels of the floor of the principal story and of the area-light, and the "pitch" of the sidewalk.

Drawing D is a plan at the sidewalk, S W being the sidewalk, composed of four granite slabs, as here shown, A L being the area-light space, and d s the light-space for the illuminating-sills at the doorways. These sills are let into the granite pillars G P and bolted fast to them, as well as to the side walls of the building, and bind the whole together.

Now, although I have made my improvements in the architecture of buildings by means of the very best combination of iron and glass that can possibly exist, yet I wish it to be distinctly understood that the extension of basements under the street by means of an illuminating-roof pavement is my invention, for a roof-pavement is such a combination of glass with iron as to be fit for being walked upon. What I mean to say is that until I did it no area-way was ever covered, and no basement was ever extended under the street by glass and iron combined to form substantially a portion of the sidewalk itself. The extension, where it did exist, was done only by means of a skylight.

What I claim, then, and desire to secure by Letters Patent, is—

1. Forming the approaches over an area-way to the doorways of a building from the sidewalk by means of a solid translucent bridging of iron and glass, which serves the double purpose of stoop and roof, substantially as herein described.

2. Uniting the area-way to the basement of a building by a water-tight roof of iron and glass, so combined as to form a generally-flush surface fit for walking upon, and laid in or nearly in the plane of the sidewalk, substantially as herein set forth.

3. Uniting the basement of a building to the space under the street by means of a translucent water-tight roofed area-way, when the glass and iron which compose the roof are so combined as to form a generally-flush surface fit for walking upon, and are laid in or nearly in the plane of the sidewalk, substantially as herein set forth.

4. Combining an area-light with the sidewalk and a building by means of a double-cemented joint made with putty or its equivalent and fusible cement, substantially as herein set forth.

5. Combining the glass of a roof-light with the iron framing of the same by means of a double-cemented joint, substantially as herein described.

6. An illuminating-roof of iron and glass, where the iron which supports the glasses in position forms the general strength of the roof, the combination being such as to secure the twofold object of equalizing and distributing the strength of the iron while distributing and equalizing the light of the glass.

7. An illuminating step-roof composed of glass and iron—that is to say, where the iron and glass are composed into illuminating-sills and illuminating-risers, and these are again combined to form an illuminating-roof, substantially in the manner and for the purposes herein set forth.

THADDEUS HYATT.

Witnesses:
W. W. HYATT,
ALFRED L. WINANS.